United States Patent
Jindal et al.

(10) Patent No.: US 9,287,995 B2
(45) Date of Patent: Mar. 15, 2016

(54) SELF-INTERFERENCE CANCELLATION

(71) Applicant: Broadcom Corporation, Irvine, CA (US)

(72) Inventors: Nihar Jindal, San Mateo, CA (US); Jun Shi, Fremont, CA (US); Sriram Sundararajan, Sunnyvale, CA (US); Arya Behzad, Los Altos, CA (US); Marcellus Forbes, San Francisco, CA (US); Ling Su, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 14/039,462

(22) Filed: Sep. 27, 2013

(65) Prior Publication Data

US 2015/0055568 A1    Feb. 26, 2015

Related U.S. Application Data

(60) Provisional application No. 61/867,942, filed on Aug. 20, 2013.

(51) Int. Cl.
*H04W 4/00*  (2009.01)
*H04B 15/00*  (2006.01)
*H04L 5/00*  (2006.01)

(52) U.S. Cl.
CPC .............. *H04B 15/00* (2013.01); *H04L 5/0048* (2013.01)

(58) Field of Classification Search
CPC ....................................................... H04W 28/04
See application file for complete search history.

(56) References Cited

U.S. PATENT DOCUMENTS

| | | | |
|---|---|---|---|
| 7,869,527 B2 | 1/2011 | Vetter et al. | |
| 2005/0213529 A1* | 9/2005 | Chow et al. | 370/320 |
| 2008/0089397 A1* | 4/2008 | Vetter et al. | 375/220 |
| 2011/0143655 A1* | 6/2011 | Ahn et al. | 455/9 |
| 2013/0114468 A1* | 5/2013 | Hui et al. | 370/277 |
| 2013/0301488 A1* | 11/2013 | Hong et al. | 370/278 |
| 2014/0233669 A1* | 8/2014 | Aggarwal et al. | 375/285 |
| 2014/0369187 A1* | 12/2014 | Sang et al. | 370/229 |
| 2015/0049834 A1* | 2/2015 | Choi et al. | 375/285 |

* cited by examiner

*Primary Examiner* — Hassan Kizou
*Assistant Examiner* — Abdelnabi Musa
(74) *Attorney, Agent, or Firm* — Brinks Gilson & Lione (57) ABSTRACT

A communication device, such as a smart phone, includes transmit/receive logic to cancel an interfering signal component. The interfering signal component may originate from a communication interface on the device itself. For example, transmissions from the communication interface may interfere with received signals at other communication interfaces on the device. Transmit/receive logic on others of the communication interfaces may use known characteristics of the interfering signal component to cancel the interfering signal component.

20 Claims, 11 Drawing Sheets

SELF-INTERFERENCE CANCELLATION

1. CROSS REFERENCE TO RELATED APPLICATIONS

This application claims priority to U.S. Provisional Application Ser. No. 61/867,942, filed Aug. 20, 2013, which is incorporated by reference in its entirety.

2. TECHNICAL FIELD

This disclosure relates to signal transmission. This disclosure also relates to interference cancellation in technologies such as cellular telephones and other devices.

3. BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Furthermore, past estimates have indicated that (as just three examples) the United States, Italy, and the UK have more mobile phones in use in each country than there are people even living in those countries. Improvements in wireless communication devices, particularly in their ability to deliver interference free signals, will help continue to make such devices attractive options for the consumer.

DETAILED DESCRIPTION

The discussion below makes reference to user equipment (UE). UE may take many different forms and have many different functions. As one example, UE may be a 2G, 3G, or 4G/LTE cellular phone capable of making and receiving wireless phone calls, and transmitting and receiving data. The UE may also be a smartphone that, in addition to making and receiving phone calls, runs any number or type of applications. UE may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in other devices, such as a base station or other network controller that communicates with the UE. A UE may include multiple wireless interfaces. Transmissions from a first of the multiple wireless interfaces may be treated as interference on a second of the multiple interfaces. Knowledge of the transmission from the first of the multiple wireless interfaces may be used to cancel effects arising from transmission from the first interface on reception at the second of the multiple interfaces.

Figure 1:
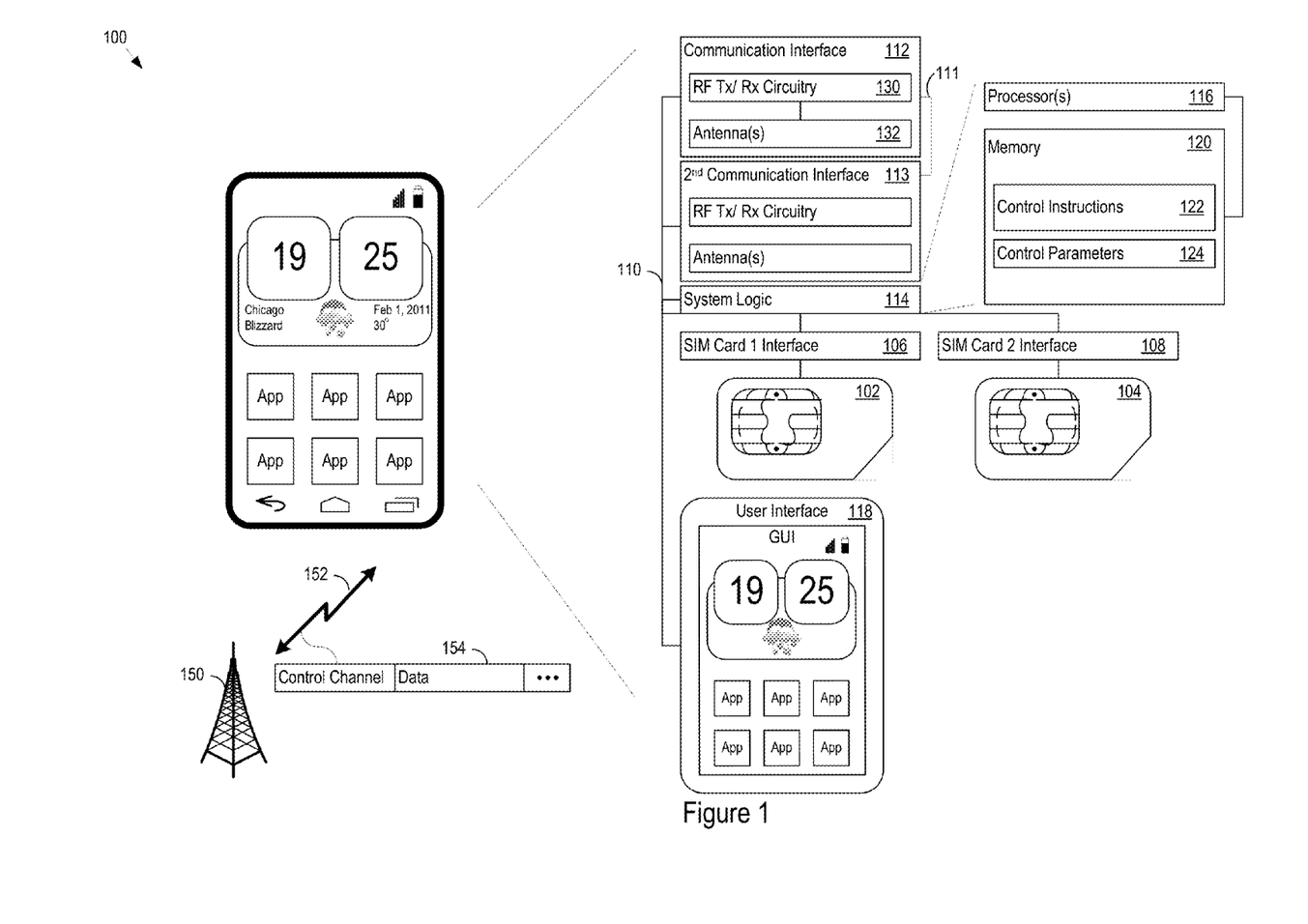
FIG. 1 shows example user equipment.

FIG. 1 is an example user equipment (UE) 100. The UE 100 may be in data communication with an infrastructure element 150, e.g., an enhanced Node B (eNB) or other base station, access point, or other infrastructure element. In some cases, the UE 100 may support one or more Subscriber Identity Modules (SIMs), such as the SIM1 102 and the SIM2 104. Electrical and physical interfaces 106 and 108 connect SIM1 102 and SIM2 104 to the rest of the UE 100 hardware, for example, through the system bus 110.

The UE 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any functionality in the UE 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 may include a graphical user interface, touch sensitive display, voice or facial recognition inputs, buttons, switches, speakers or other user interface elements.

In the communication interface 112, Radio Frequency (RF) transmit (Tx) and receive (Rx) circuitry 130 handles transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations, e.g., QPSK, 16-QAM, 64-QAM, or 256-QAM, frequency channels, bit rates, and encodings. As one specific example, the communication interface 112 may support transmission and reception under the 4G/Long Term Evolution (LTE) standards. The techniques described below, however, are applicable to other communications technologies whether arising from the 3rd Generation Partnership Project (3GPP), GSM® Association, Universal Mobile Telecommunications System (UMTS), High Speed Packet Access (HSPA)+, or other partnerships or standards bodies.

The UE may support a second (or more) communication interface 113. The second communication interface many support various networking standards such as wireless local area networking (WLAN) (e.g., 802.11 family standards), WiMAX (802.16), Bluetooth or other networking standards. The second communication interface 113 may use a second antenna or group of antennas. Additionally or alternatively, the second communication interface 113 may share an antenna with the communication interface 112. For separate antennas, transmissions from the communication interface 112 may be received on the second communication interface 113 as an interfering signal, or vice versa. For shared antennas, a switch or multiplexer may be used to allow shared antenna usage. In some cases, the switch or multiplexer may not provide full isolation between the operations of the communication interfaces 112, 113. Self-interference, e.g., interference from among elements on a single device, may be experienced by one or both of the communication interfaces. The communication interfaces 112,113 may include system to cancel interference from the other communication interface based on known properties of the interfering signal.

A reference path 111 may be situated physically or logically between the communication interfaces 112, 113. The reference path 111 may provide a reference signal from one communication interface to the other which may be used to determine properties of an interfering signal from the providing communication interface. For example, if communication interface 112 provides a reference signal to communication interface 113, communication interface 113 may use the reference signal to gain knowledge of the properties of transmissions from communication interface 112. The reference path may be unidirectional or bidirectional. Additional or alternatively, multiple unidirectional reference paths may be used. The reference path 111 may include a guided medium, e.g., wireline transmission, and/or free space transmissions, e.g., wireless or over the air transmissions.

The system logic 114 may include one or more processors 116 and memories 120. The memory 120 stores, for example, control instructions 122 that the processor 116 executes to carry out any of the processing or control functionality described below, operating in communication with the circuitry in the communication interfaces 112, 113. For example, the system logic 114 may reprogram, adapt, or modify parameters or operational characteristics of the logic in the communication interfaces 112, 113 and in the system logic 114 itself. In some implementations, the functionality system logic 114 may be implemented in or by the communication interfaces 112, 113.

The control parameters 124 provide and specify configuration and operating options for the control instructions 122. As will be explained in more detail below, the memory 120 may also store parameters for interference signal cancellation components.

As noted above, the UE 100 is in communication with the infrastructure element 150 over one or more control channels 152. The infrastructure element 150 sends messages to the UE 100 over the control channels 152. The messages may include operating parameters 154, such as power control parameters, bandwidth allocation parameters, or other operating parameters.

Figure 2:
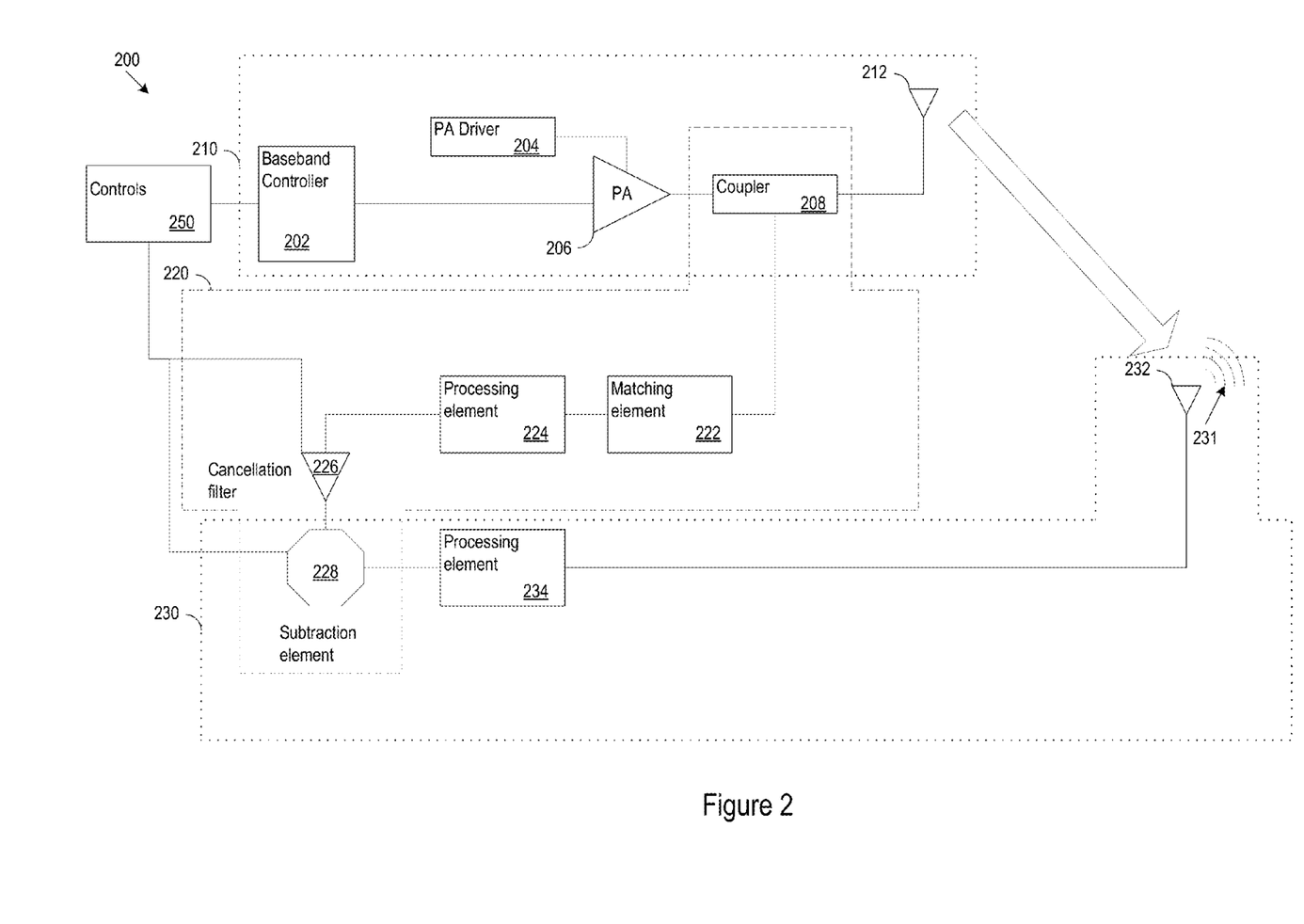
FIG. 2 shows example transmit/receive logic.

FIG. 2 is an example of transmit/receive logic 200 ("logic 200"). The transmit/receive logic 200 may be present in the UE 100. The logic 200 may be implemented by any combination of a baseband controller, RF integrated circuits (ICs), RF transmission lines, filters (e.g., linear, multi-tap, nonlinear, or other filter) power amplifiers, or other circuitry. Accordingly, the logic 200 may map to one or more portions of the communication interfaces 112, 113 and the system logic 114.

In the example in FIG. 2, the logic 200 includes a baseband controller 202, a power amplifier (PA) driver 204, a PA 206, a coupler 208, and an antenna 212 on transmit line 210. The logic also includes reference line 220, which includes coupler 208, also includes a matching element 222, a processing element 224, a cancellation filter 226, and a removal element 228. The receive line 230, includes the removal element 228 and further includes a processing element 234 and an antenna 232. Additionally or alternatively, the functionality of cancellation filter 226 may be partially or fully disposed on the receive line 230. The logic 200 further includes controls 250 which may set operational parameters for components on the transmit 210, reference 220, and/or receive 230 lines.

In various implementations, the transmit line 210 may output a transmission containing a data stream via antenna 212. For example, the transmit line may correspond to a portion of the communication interface 112, e.g., a cellular data interface. Some portions of the transmission may be received at the antenna 232 on the receive line 230. In some cases, the receive line 230 may correspond to a portion of the second communication interface 113. The receive line 230 may be compliant with one or more protocols, e.g., WLAN, Bluetooth, and/or other protocol, different from that of the transmit line 210. The antenna 232 may receive a receive component 231 compliant with the protocol. The input signal received on the received line may include a signal component derived from the datastream. The signal component may be treated as self-interference on the receive line.

Figure 3:
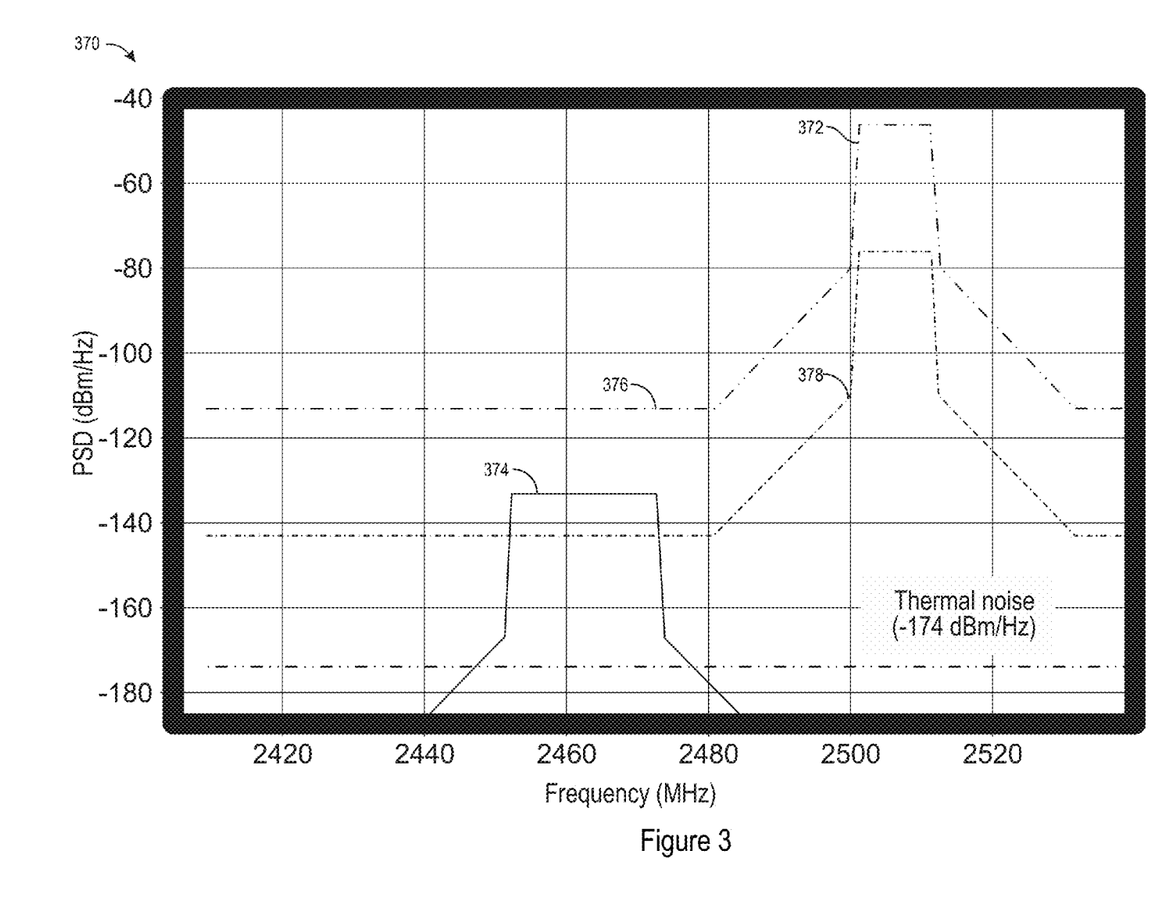
FIG. 3 shows a plot of an example signal power spectrum.

For example, the transmit line may correspond to a portion of a cellular data transmitter, e.g., LTE/LTE-A, or other cellular data transmitter type, operating at a frequency, (e.g., 2.5 GHz, 2.1 GHz, 800 MHz, or other carrier frequency) near the operating frequency (e.g., 2.4 GHz, 700 MHz, or other carrier frequency) of a receive line acting as a wireless networking receiver (e.g., WLAN, or other networking receiver type). FIG. 3 shows a plot 370 of an example signal power spectrum. The cellular data transmit power spectrum 372 may overpower the power spectrum of the wireless networking signal 374. In some cases, the reception of the wireless networking signal may be degraded. The shoulder 376 amplitude of the transmit power spectrum 372 may be greater than the wireless networking signal at its fundamental. Filtering may be applied. The spectrum after filtering 378 is shown in FIG. 3. In some cases, the filtering may be insufficient to reduce the self-interference to a level resulting in a suitable signal-to-noise ratio (SNR) for clear reception of the wireless networking signal.

In some implementations, known properties of self-interference may be used to mitigate the self-interfering signal. For example, a cellular data transmission may be derived from a data stream available on-device. In such cases, it may be possible to determine the effects of the cellular data transmission based on the available data stream and remove these effects.

Referring again to FIG. 2, prior to transmission via the antenna 212, a signal containing the data stream may be coupled out at the coupler 208 and provided to the reference line 220. The coupler 208 may couple out various portions of the signal, e.g., 5%, 10%, 25%, 50%, 75% or other signal portion, for provision to the reference line 220. The coupled out signal may be used as a reference signal for the basis of cancellation of the self-interfering signal component. The reference signal may be passed through a matching element 222. In some cases, the matching element 222 may be used to attempt to match effects experienced by the interfering signal component on its path to the removal element. These effects may include effects from the guided portions (e.g., along the transmit 210 and receive 230 lines) of the signal path. Additionally or alternatively, attempts to match effects of the wireless portion of the signal path may also be applied to the reference signal by the matching element. In some implementations, the matching element may include filters (e.g., linear, multi-tap, nonlinear, or other filter), delay lines, attenuators, and/or other RF components.

In some implementations, the processing element 224 may perform processing tasks (e.g., transformations, conversions, digital signal processing, or other processing task) on the reference signal. For example, the processing element may include an analog-to-digital converter (ADC). The ADC may facilitate extraction of a portion of the data stream from the reference signal. Further, digital signal processing techniques may be available for digital domain signals.

The reference signal may be passed through a cancellation filter 226. The cancellation filter 226 may accept the reference signal as an input and produce a cancellation output. To produce the cancellation output, the cancellation filter 226 may attempt to match the reference signal, or a portion of the reference signal, to the signal component from the receive line 230. In some implementations, to facilitate the attempted matching, the cancellation filter 226 may be trained, as discussed in detail below, to apply effects to the reference signal. The cancellation filter 226 may include logic to facilitate such training. Additionally or alternatively, the controls 250 may support such training functionality. The cancellation filter 226 may include signal processing elements such as filters, attenuators, or other processing elements. The training process may include the determination of various parameters for the signal processing element of the cancellation filter 226. For example, the training process may determine parameters for a multi-tap filter included in the cancellation filter 226. The effects may include modeled-based effects from the wireless channel in the signal component transmission path. In some cases, effects from hardware on the transmit 210 and receive 230 lines may be modeled in the matching attempt. In various implementations the functionality of the matching element 222 and cancellation filter 226 may be performed via a single unit. In some implementations, the matching element 222 may treat static effects and the cancellation filter 226 may treat dynamic and/or transient effects.

The cancellation output is provided by the reference line to an input of the removal element 228. The removal element 228 may combine the cancellation output and the receive signal, including the self-interfering signal component, to attempt to remove the signal component. In various implementations, the removal element 228 may include signal combiners (e.g., summers or subtraction circuits, other signal combiner) and signal inversion circuits (e.g., phase shifters, voltage inverters, or other inversion circuit) to perform the removal.

Figure 4:
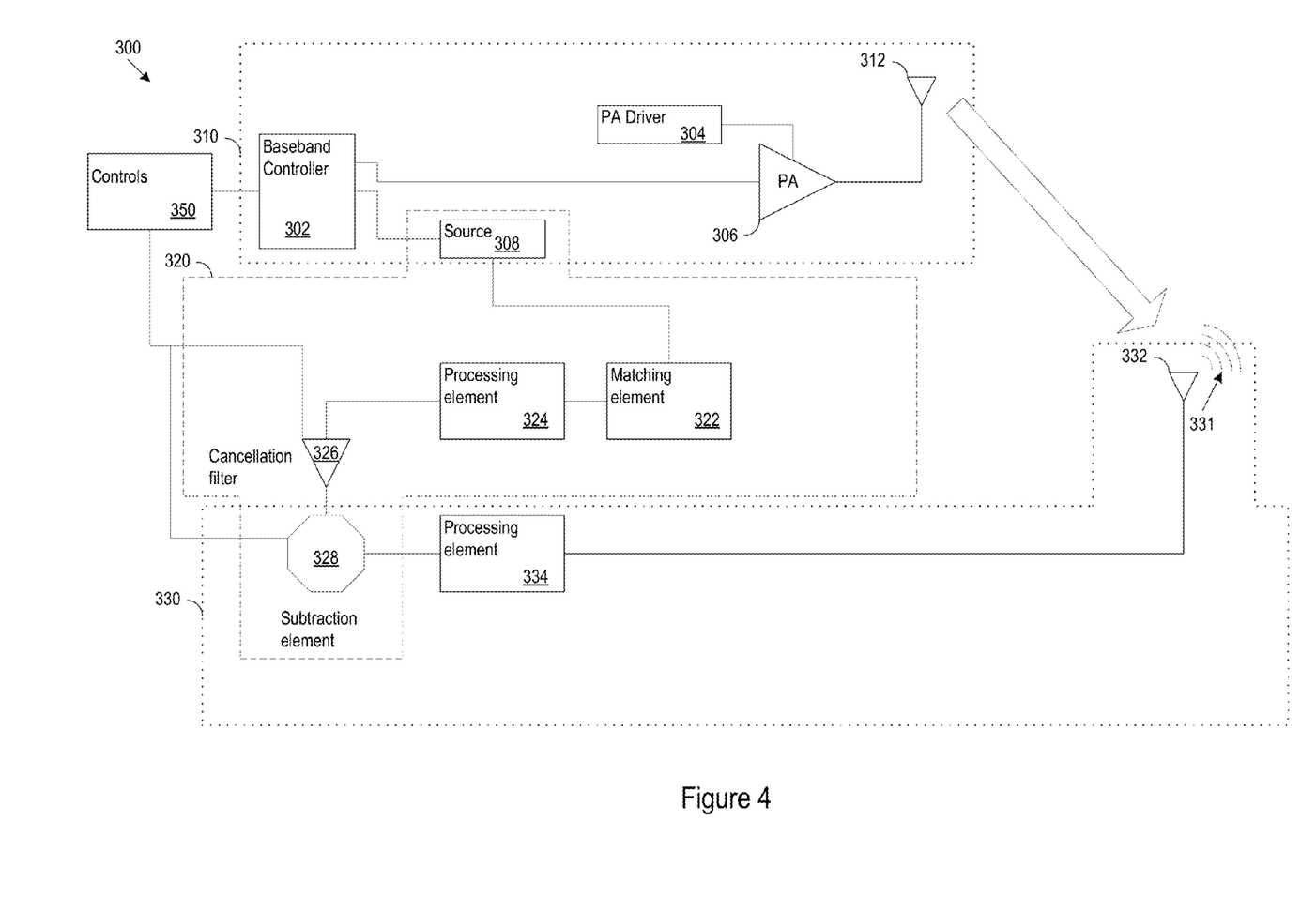
FIG. 4 shows an example transmit/receive logic with a direct reference line.

FIG. 4 is an example of transmit/receive logic 300 with a direct reference line 320. As with the logic 200 above, the transmit/receive logic 300 may be present in the UE 100, and the logic 300 may map to one or more portions of the communication interfaces 112, 113 and the system logic 114.

In the example in FIG. 4, the logic 300 includes a transmit line 310, including a baseband controller 302, a source 308, a PA driver 304, a PA 306, and an antenna 312. The logic also includes reference line 320, which includes the source 308, a matching element 322, a processing element 324, a cancellation filter 326, and a removal element 328. The source may be a digital signal source. In some cases, the location of the source may obviate some functionality of processing element 324. The receive line 330, includes the removal element 328 and further includes a processing element 334 and an antenna 332. The antenna 332 may receive a receive component 331 compliant with the determined protocol(s) of the receive line. Additionally or alternatively, similar to example logic 200, the functionality of cancellation filter 326 may be partially or fully disposed on the receive line 330. Controls 350 may set operational parameters for components on the transmit 310, reference 320, and/or receive 330 lines.

In some implementations, portions of the transmit 310 and receive 330 lines may map to the communications interfaces 112 and 113, respectively. Further, transmissions from transmit line 310 may contribute a self-interfering signal component on receive line 330. A reference signal passed from the transmit line 310 to the receive line 330 via the reference line may be used in the mitigation of the self-interfering signal component.

The source 308 on reference line 320 may include a digital signaling source. For example, the source 308 may include digital domain signaling. In various implementations the source 308 may provide signaling from varied points along the transmission line. In some cases, signaling may be provided after codewords are mapped via transmit or spatial diversity schemes. Providing signaling after mapping may ensure information is not added to the transmission after the source 308. In some cases, the source 308 may provide baseband coded signals. In some cases, the source 308 may provide signals from the MAC or application layers, for example, a software element may serve as the source 308. Independent of the type of signal provided by the source 308, the signal provided by the source may be used as a reference signal for the removal of the self-interfering signal component on the receive line 330.

The reference signal may be provided to the cancellation filter 326 and matching element 322 to attempt to match effects experienced by the self-interfering signal component along its travel path (e.g., transmit line 310, wireless channel, and receive line 330) and provide a cancellation output to the removal element 328, similar to cases discussed above with respect to the example logic 200. The cancellation output may then be subtracted from the received signal including the self-interfering component. In some implementations, the cancellation filter 326 may be dynamically trained, as will be discussed below.

Figure 5:
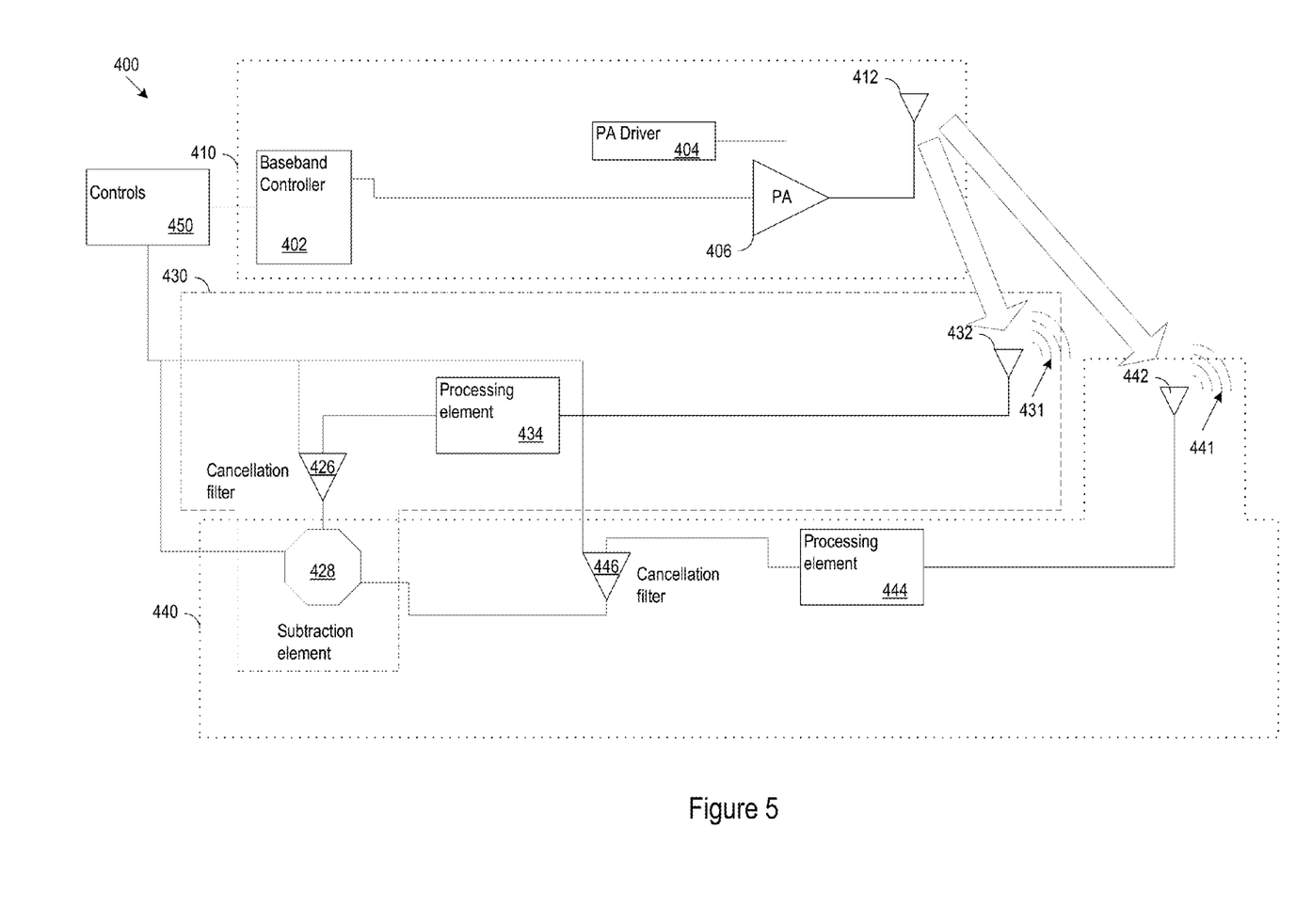
FIG. 5 shows an example transmit/receive logic with multiple receive lines.

FIG. 5 is an example of transmit/receive logic 400 with multiple receive lines. In the example in FIG. 5, the logic 400 includes a transmit line 410, including a baseband controller 402, PA driver 404, a PA 406, and an antenna 412. The first receive line 430, includes a removal element 428, a cancellation filter 426, a processing element 434, and an antenna 432. The second receive line 440 includes the removal element 428 and further includes a cancellation filter 446, a processing element 444, and an antenna 442. In some cases, the functionality of cancellation filters 426 and 446 may be combined into a single cancellation filter on of the receive lines. In some implementations, the logic 400 may have three or more receive lines including antennas and a connection to removal element 428. The logic 400 may have a receive line for individual inputs that it receives (e.g., MIMO, MISO, or other multiple input scheme). Further, the logic may have receive lines for individual interference sources that are addressed by the system.

A transmission from transmit line 410 may be (partially) received on receive lines 430 and 440 as a self-interfering signal. The input to the receive lines may also include receive components 431, 441 compliant with the determined protocol(s) of the receive lines 430, 440. The receive components 431, 441 may mix with the self-interfering signal causing degradation of the signal extracted from the inputs. In some cases, the reception of a given self-interfering signal component on multiple receive lines may be used to remove the self-interfering signal component from the received signals, e.g., destructive interference, heterodyning, digital signal cancellation, or other removal technique. The receive components 431, 441 may include common content. Removal of the self-interfering component mixed with receive components 431, 441 may allow for extraction, by the transmit/receive logic 400, of the common content present on receive components 431, 441.

In various implementations, the first receive line 430 may receive an input signal including a signal component arising from an interference source, such as a self-interfering signal, an on-chip emitter (e.g., a spur, or other on-board emitter), a competing wireless communication system, or other interference source. The second receive line 440 may receive another input signal including an associated signal component arising from the same interference source. The cancellation filters 426 and 446 may attempt to balance the signal component and associated signal component such that upon combination they cancel. For example, the signal component and associated signal component may together have a spatial signature. The controls 450 may set parameters on the cancellation filters 426 and 446 such that the signal output after combination at the removal element 428 is minimized for that spatial signature, e.g., by using a zero-forcing criterion to set the filter parameters. In various implementations, either of the received input signals on receive lines 430 and 440 may be treated as a reference signal. Additionally or alternatively, either of the received input signals may be viewed as partially a reference and partially an input signal. Accordingly, the the receive lines 430 and 440 may be individually viewed partially or fully as a reference line.

The example logic 200, 300, 400 was discussed in terms of transmitting on transmit lines 210, 310, 410 and receiving on receive lines 230, 330, 430, 440. In various implementations, transmit lines 210, 310, 410 may be capable of receiving and receive lines 230, 330, 430, 440 may be capable of transmitting.

Figure 6:
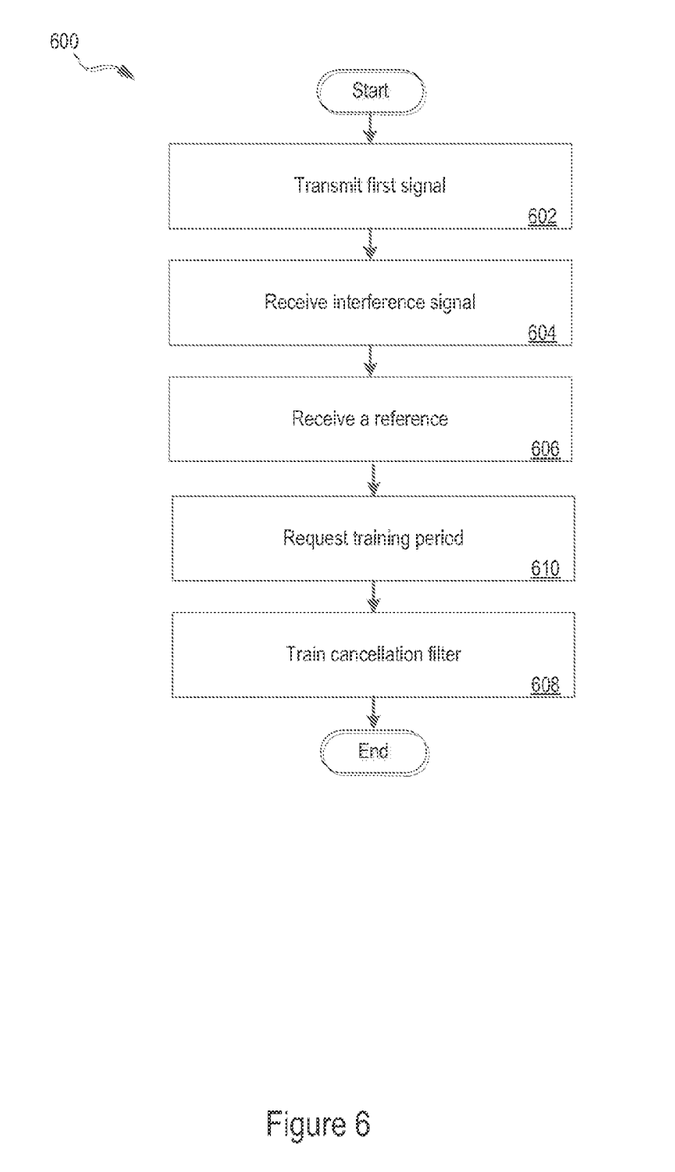
FIG. 6 shows an example of signal component minimization training logic.

FIG. 6 is an example of signal component minimization training logic 600. In some implementations, transmit/receive logic (e.g., 200, 300, 400) may be trained to reduce a received signal component arising from a transmission originating on the device (e.g., a self-interference signal). The training may occur during a training period established by the device.

A UE 100 may transmit a first signal from a first antenna of the UE 100 (602). The signal may include a wireless transmission, e.g., cellular, WLAN, or other wireless transmission. The signal may include a signal centered at a first frequency (or multiple-frequencies, e.g., multi-carrier) and include leakage or spurious transmission at other frequencies. As discussed above, the first signal may interfere with other signals outside the first signal's nominal transmission frequency range.

The UE 100 may receive an interference signal component arising from the first signal on a second antenna of the UE 100 (604). The interference signal component may share various characteristics with the first signal. In some cases, knowledge of the transmitted first signal may be used to mitigate interference caused by the received interference signal component based on the shared characteristics.

To facilitate mitigation of the interference signal, the receive logic (e.g., receive lines 230, 330, 430, and/or 440) associated with the second antenna may receive, via a reference path (e.g., 220, 320, 430 and/or 440), a reference (606). The reference signal may be provided (or provided in part) by the transmit logic, e.g., transmit lines 210, 310, and 410, associated with the first antenna. The reference signal may originate from a common source with the first signal (e.g., a common data stream, a portion of the signal to the first antenna, the same transmission from the first antenna, or other common source). The reference signal may then confer information on characteristics of the interference signal.

The UE 100 may train a cancellation filter, e.g., 226, 326, 426, and/or 446, in the reference path based on the interference signal and reference signal, during the training period (608). The training may be implemented using controls (250, 350, and 450) to determine and set parameters of the cancellation filters.

In an example, an algorithm is used to determine the parameters of the filter. The input signal at the removal element (e.g., 228) including the interfering component may be represented by:

$$y_1[n]=u[n]*h_1[n]+x[n]+z_1[n]$$

and the reference signal at the removal element may be represented by:

$$y_2[n]=u[n]*h_2[n]+z_2[n]$$

where:
    x[n] is the non-interfering portion of the received input signal.
    u[n] is the transmission from the first antenna.
    $h_1[n]$, $h_2[n]$ are impulse responses from the self-interfering signal path (e.g., transmit line, wireless channel, and receive line) to the reference path, respectively.
    $z_1[n]$, $z_2[n]$ are thermal noise contributions.
    n is the time index (e.g., a sampling period, frame, symbol period, or other time period).

In this case, the cancellation filter may attempt to match the composite impulse response on the reference path to the response $h_1[n]$. Thus, the impulse of the filter (f[n]) may satisfy:

$$f[n]*h_2[n]=h_1[n]$$

In some implementations, the training may be performed in the presence of a non-interfering portion on the second antenna (online training). In other words, with online training, the training may be performed while transmissions intended to be received by the second antenna are present. In this case, the controls may seek to minimize the interfering component and while attempting to minimize the effect on the non-interfering signal. In some cases, for a provided reference signal (e.g., example logic 200 and 300) the controls may minimize the output signal of the removal element. This minimization may be based on an assumption that the reference signal may be effectively a noise component with respect to the non-interfering portion. The reference signal may then have no integrated subtractive effect on the non-interfering portion. Any cancellation achieved may then be from the interfering signal component. The training may be based on an average of samples to avoid selecting an improper minimization corresponding to an incidental signal low.

In various implementations, during the training period the transmit logic, e.g., transmit lines 210, 310, and 410, may transmit a dummy signal on the first antenna. The dummy signal may be a random content transmission (e.g., a random/pseudo-random data sequence, or other random content transmission). The dummy signal may be a transmission with predetermined characteristics (e.g., a table sequence, set pseudo-random sequence, series of known commands, a signal that cycles through feasible bandwidth and power settings, or other predetermined signal type). For example, an LTE signal may vary in bandwidth, e.g. 5 MHz, 10 MHz, 20 MHz. In some cases, a training period (or portion thereof) may be used for each possible bandwidth. In implementations with multiple available filters, a determined filter may be applied depending on the parameters of the self-interfering transmission. In some implementations, a common filter may be applied to self-interfering transmissions of differing parameters. Signals present in the self-interfering transmission may indicate parameters of the self-interfering transmission, e.g. band, bandwidth, and/or other parameters. Additionally or alternatively, parameter may not be determined a priori. For example, in the LTE example, a power level of the self-interfering transmission may not be indicated within the transmission. Further, to avoid interference with other systems the dummy transmission may be compliant with the transmission protocol(s) of the transmission logic. For example, during the training period the UE 100 may transmit a protocol-complaint request to transmit data. The UE 100 may then transmit data for the purposes of the training period. The data may include data scheduled to be sent by the UE 100, random data, and/or predetermined data sequences.

In some implementations, the receive lines, e.g. 230, 330, 430, and/or 440, may include components with multiple settings. For example, the receive lines may include a dynamically tunable gain element. The training period may include training portions for different configurations of settings on the receive line. For example, the receive line may cycle through a number of configurations while the training period is ongoing. In some implementations, a training period may occur or be triggered when a new receive line configuration is implemented. In some implementations, multiple receive configurations may share common trained parameters.

In some implementations, during the training period the transmit logic may exhibit no special behavior. For example, the transmit logic may transmit normally scheduled transmissions from the antenna and the receive logic (e.g., 230, 330, 430, and/or 440) and controls (e.g., 250, 350, and 450) may base the training on transmissions that incidentally occur from the transmit logic.

In some implementations, the training period may be performed in the absence of a non-interfering input signal portion (offline training). To facilitate this, the UE 100 may request a training period from an infrastructure element (610). For example, the UE 100 may transmit a message that may pause transmissions intended for the receive logic. In some cases, the message may cause a pause in transmissions for the protocol of the receive logic (e.g., 230, 330, 430, and/or 440). This pause may affect transmitters associated with the receive logic. Additionally or alternately, this pause may affect transmitters unassociated with the receive logic within the range of the message. Such a training request may occur prior to the training period and prior to training the cancellation filter.

In some implementations, the message may include a request to transmit via the protocol of the receive logic by the UE 100. Transmitters in reception of the request may halt transmissions to allow for the UE to transmit without interference. The UE 100 may then decline to transmit via the protocol of the receive logic and engage in training.

In various implementations, the message may include a request for a transmission free period. For example, the UE 100 may make a specific request for silence transmitters in receipt of the message.

In some implementations, training may occur at multiple intervals (e.g., periodically, on demand, via interference level triggers, if a reduction in interference cancellation is detected, if a change in excess of a determined threshold in the propagation channel on any wireless interface is detected, at power-on/wake-up/sleep, or other interval) to account for changing conditions. For example, a user may alter hand-hold or place the UE 100 in an enclosed area changing the wireless channel.

In various implementations, offline and online training may be used in different circumstances. For example, offline training may be used to determine static or long term parameters for matching elements and/or cancellation filters and online training may be used to determine transient parameters for matching elements and/or cancellation filters. Additionally or alternatively, offline training may be used in coarse determination of parameters for matching elements or cancellation filters and online training may be used in fine determination of parameters for matching elements or cancellation filters, or vice versa. In some implementations, initial parameter determinations, or those of infrequent periodicity, may be handled via offline training, while update-type, or more frequent periodicity, determinations may be handled via online training. In various implementations, parameters may be exclusively determined via online or offline training. Further, in some cases, parameters may be set via characterizations not based in training. For example, default setting may be determined based on elements in the signal path and/or models of the wireless channel, e.g., independent of sampled transmission from the UE itself.

In various implementations, a training period may be tens of microseconds to a few milliseconds in duration. Successive training periods may occur tens of milliseconds apart and/or seconds, or greater intervals, apart. As discussed above the intervals separating training periods may be configured for the system.

Figure 7:
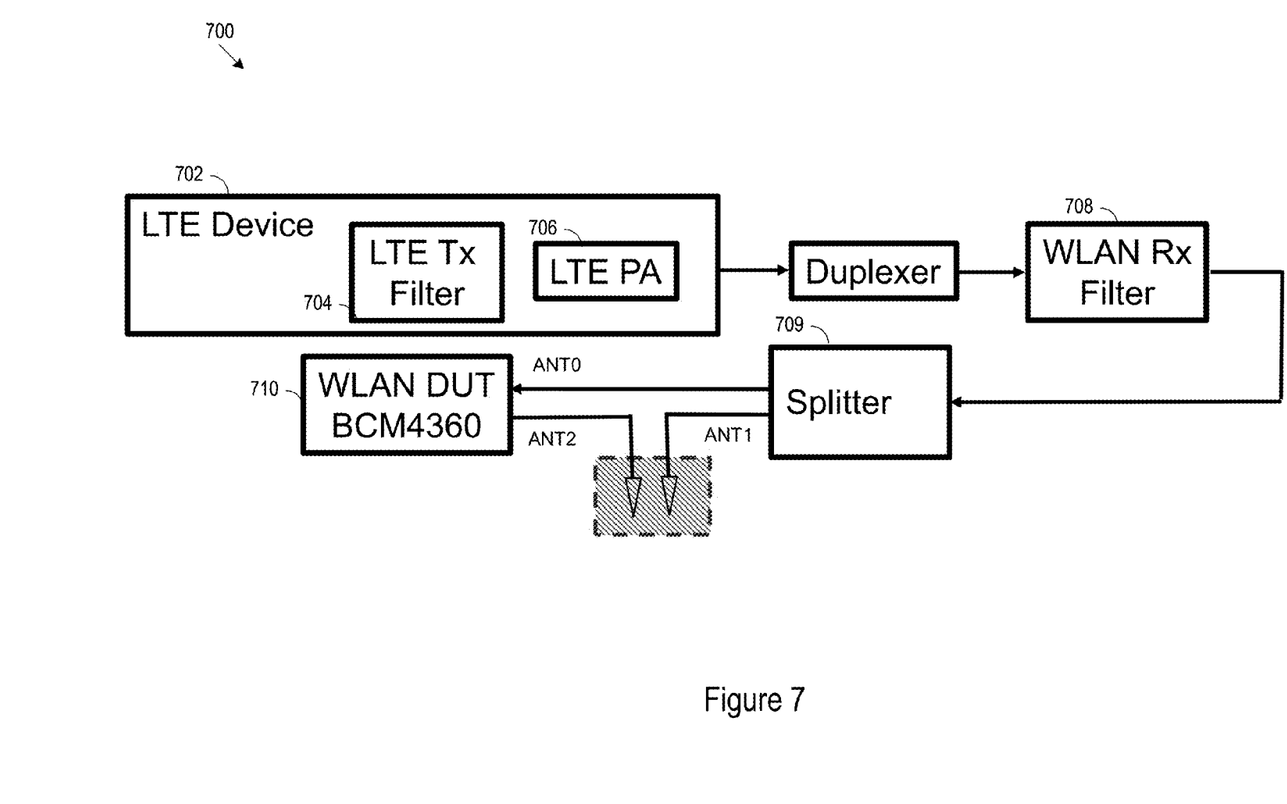
FIG. 7 shows an example self-interference system.

FIG. 7 is an example self-interference system 700. A LTE device 702 including a filter 704 resulting in a 10 MHz band centered at 2505 MHz. The LTE device 702 also includes an amplifier 706. The received signal from the LTE device 702 is filtered 708 at a WLAN frequency, centered at 2472 MHz. The WLAN band filtering provides baseline interference mitigation. The signal is passed to a splitter 709 which provides ANT0 with a reference signal and transmits the remaining portion, via ANT1. The transmission is (partially) received at ANT2 as a self-interfering signal. The WLAN device under test (DUT) 710 receives the reference signal and the self-interfering signal. In this example the WLAN DUT includes a BCM4360 chip. The WLAN DUT may cancel the self-interfering signal using the reference signal.

Figure 8:
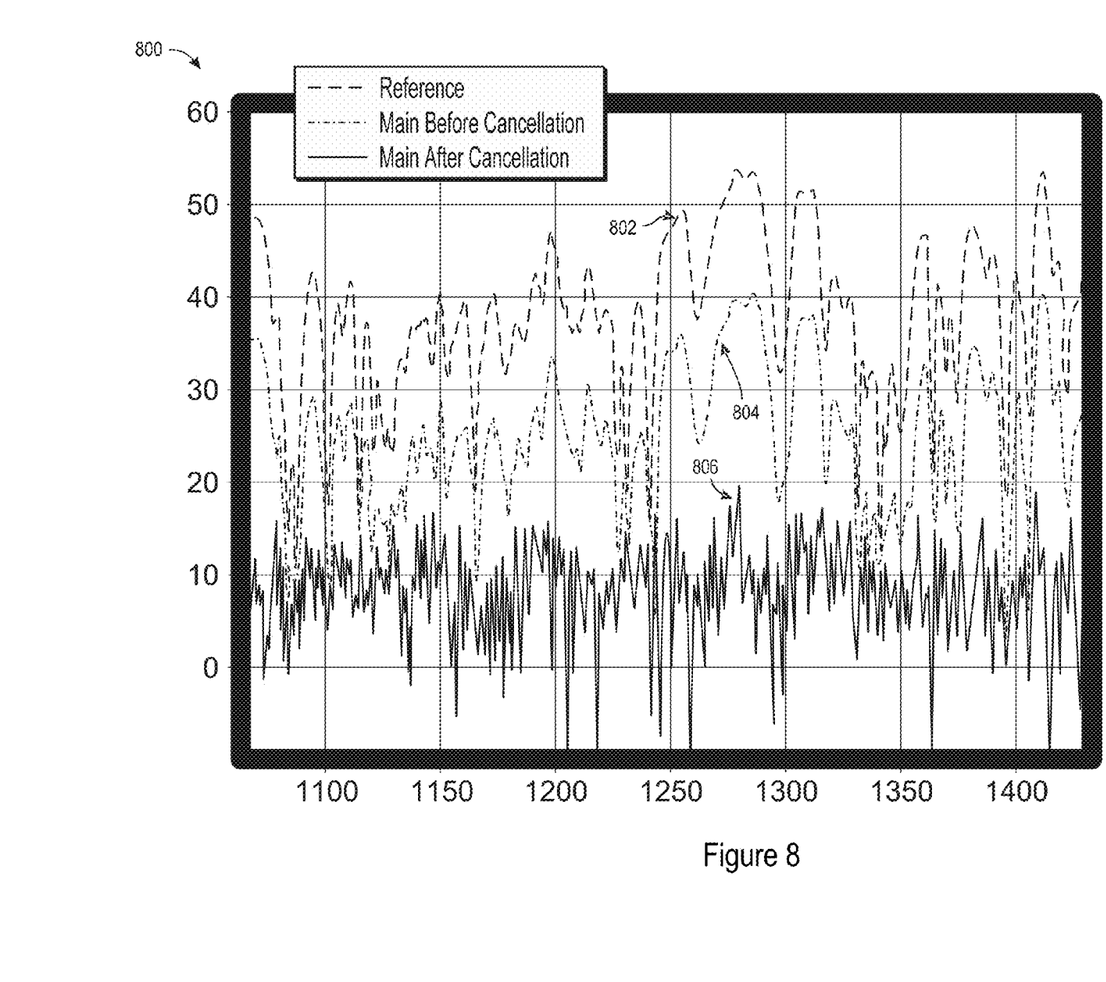
FIG. 8 shows example time domain cancellation for the example self-interference system of FIG. 7.

FIG. 8 shows example time domain cancellation 800 for the example self-interference system 700. The reference signal 802 shares characteristics with the self-interfering signal 804. In the example effective cancellation is shown 806.

Figure 9:
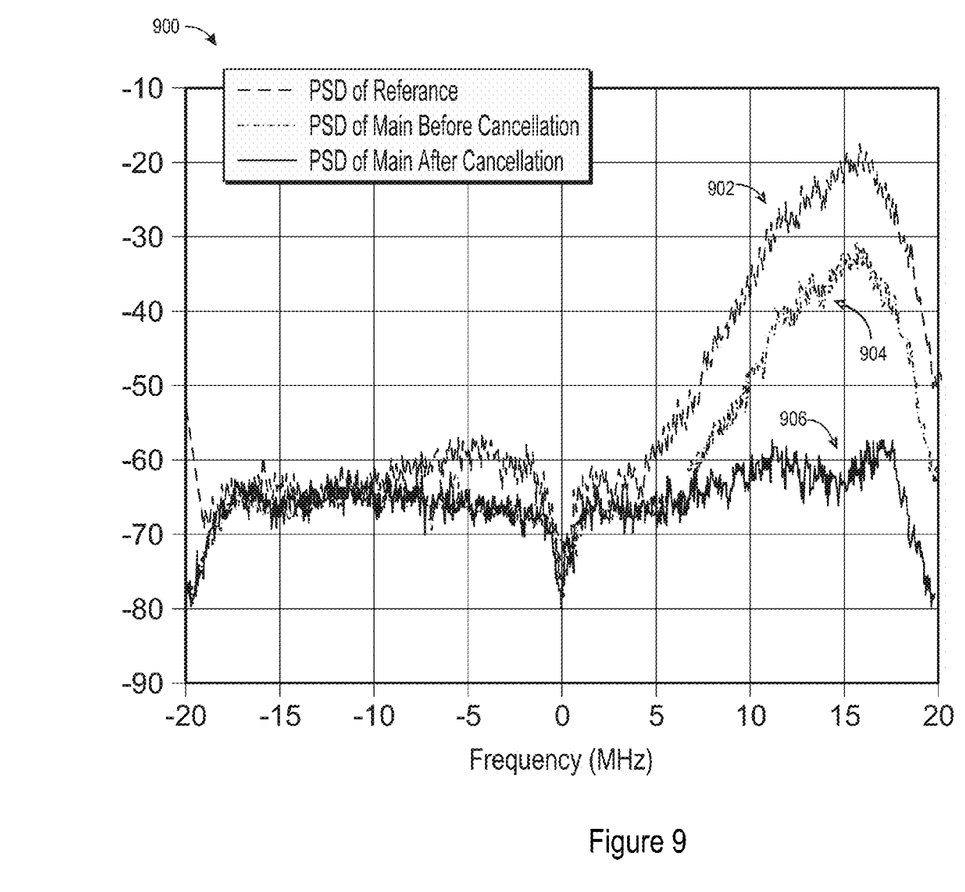
FIG. 9 shows example frequency domain cancellation for the example self-interference system of FIG. 7.

FIG. 9 shows example frequency domain cancellation 900 for the example self-interference system 700. The reference signal 902 shares characteristics with the self-interfering signal 904. In the example effective cancellation is shown 906.

Figure 10:
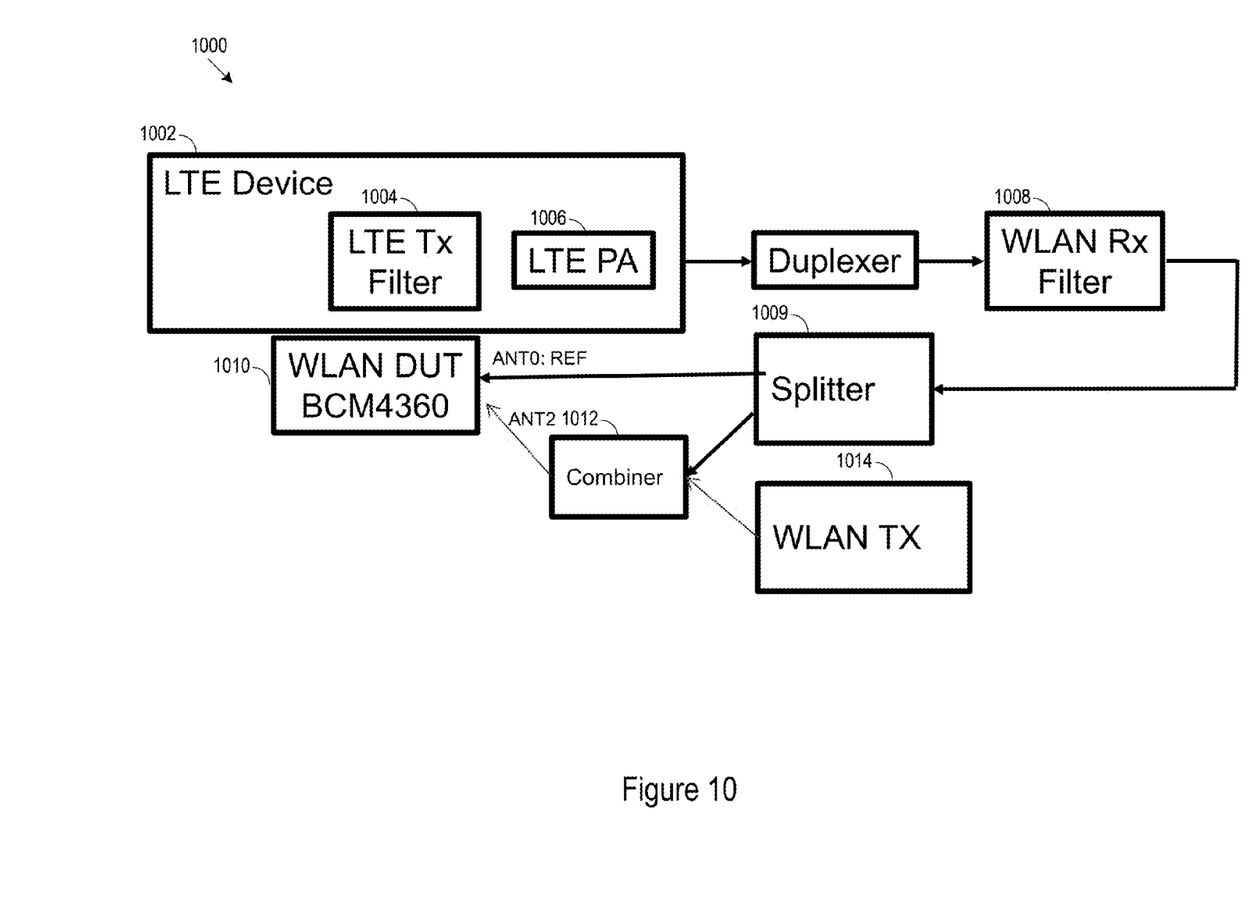
FIG. 10 shows an example self-interference system.

FIG. 10 is an example self-interference system 1000. A LTE device 1002 including a filter 1004 resulting in a 10 MHz band centered at 2505 MHz. The LTE device 1002 also includes an amplifier 1006. The received signal from the LTE device 1002 is filtered 1008 at a WLAN frequency, centered at 2472 MHz. The WLAN band filtering provides baseline interference mitigation. The signal is passed to a splitter 1009 which provides ANT0 with a reference signal and passes the remaining portion to a combiner 1012. The other terminal of the combiner 1012 receives a WLAN signal from a WLAN generator 1014. The WLAN device under test (DUT) 1010 receives the WLAN signal, and the self-interfering signal, via ANT2.

Figure 11:
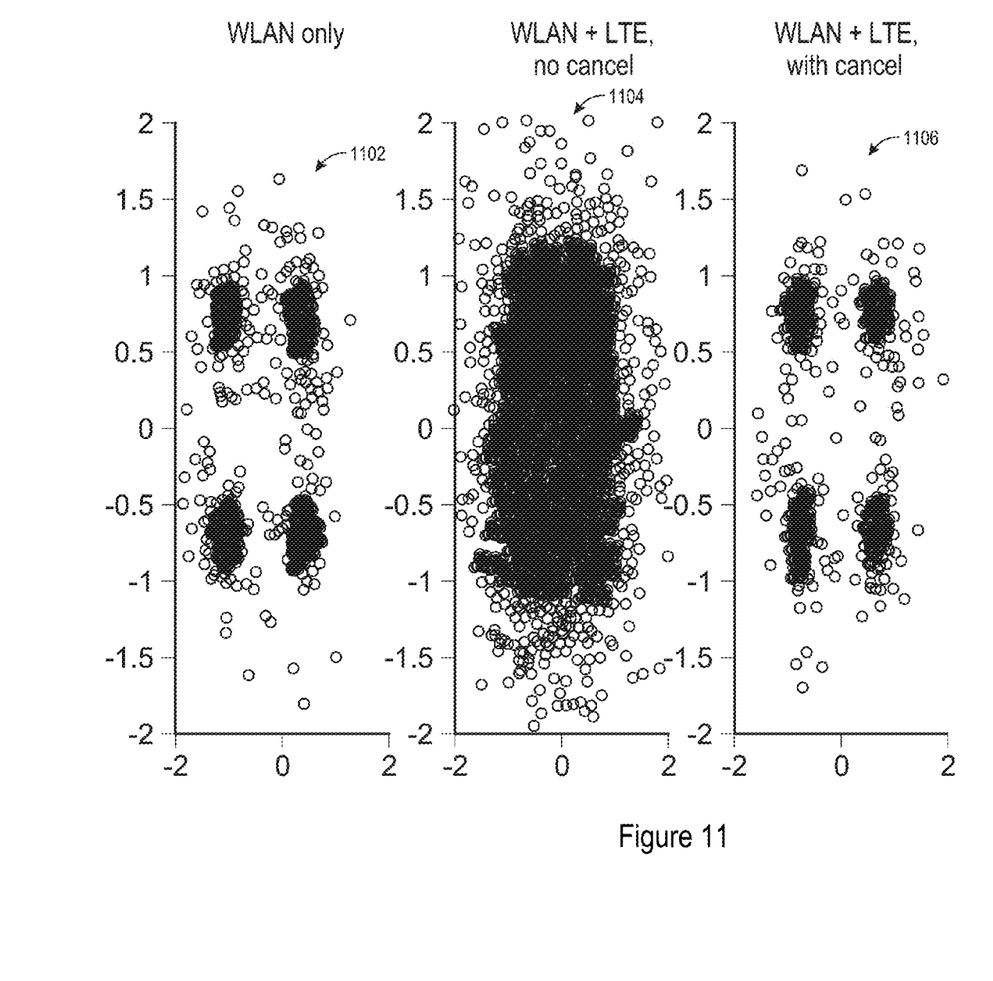
FIG. 11 shows example constellations for the example self-interference system of FIG. 10.

FIG. 11 shows example constellations 1102, 1104, 1106 for the example self-interference system 1000. The WLAN input (constellation 1102) is distorted (constellation 1104) by the self-interfering signal. After cancellation (constellation 1106), the WLAN signal is restored.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various implementations of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
   a first wireless interface configured to transmit a data stream over a wireless channel;
   a second wireless interface configured to receive an input signal including a signal component arising from transmission of the data stream;
   a reference path configured to provide a reference signal from the first wireless interface to the second wireless interface;
   a cancellation filter configured to attempt to match the reference signal to the signal component, and provide a cancellation output;
   removal circuitry configured to remove the cancellation output from the input signal received at the second wireless interface; and
   control circuitry configured to:
     request a training period to train the cancellation filter; and
     train the cancellation filter to match an effect of the wireless channel by:
       performing a cancellation analysis of the signal component during the training period; and
       setting a parameter of the cancellation filter responsive to the cancellation analysis.

2. The system of claim 1, where the first wireless interface comprises a first protocol wireless interface; and where the second wireless interface comprises a second protocol wireless interface different from the first protocol wireless interface.

3. The system of claim 1, where the reference path comprises a wireless channel and an antenna configured to receive the reference signal and the input signal.

4. The system of claim 1, further comprising:
   a signal path leading to the first wireless interface; and where:
   the reference path comprises matching circuitry configured to match an effect caused by the signal path.

5. The system of claim 1, further comprising:
   a signal path leading to the cancellation filter; and where:
   the reference path comprises matching circuitry configured to match an effect caused by the signal path.

6. The system of claim 1, where the reference path couples a baseband processor of the first wireless interface to the second wireless interface.

7. The system of claim 6, where the reference signal comprises a baseband coded digital signal that serves as the basis of the data stream.

8. The system of claim 1, where control circuitry is configured to request the training period by transmitting a silence request.

9. The system of claim 1, where control circuitry is configured to request the training period by transmitting an impending transmission indicator.

10. The system of claim 1, where control circuitry is configured to perform the cancellation analysis of the signal component by performing a minimization on the signal component.

11. A method comprising:
    transmitting a first signal from a first antenna;
    receiving an interference component arising from the first signal on a second antenna;
    receiving a reference via a reference path;
    transmitting an impending transmission indicator to request a training period from network controller circuitry; and
    training a cancellation filter in the reference path based on the interference component and reference signal, during the training period.

12. The method of claim 11, further comprising, during the training period, transmitting a dummy transmission as the signal.

13. The method of claim 11, where the reference and the interference component comprise signals derived from a common data stream.

14. The method of claim 11, the first signal comprises a cellular telecommunication signal.

15. The method of claim 11, where the training comprises setting a parameter of the cancellation filter.

16. A device comprising;
    a first wireless interface configured to transmit a first signal associated with a first protocol;
    a second wireless interface configured to:
      receive a second signal associated with a second protocol from network controller circuitry, the second protocol being different from the first protocol;
      receive a self-interfering signal component arising from the first signal; and convert the second signal and self-interfering signal component to a digital stream with a digital self-interfering component; and a reference path comprising:
- a digital signal source configured to provide a digital reference signal having a common origin with the first signal;
- a cancellation filter to attempt configured to match the reference signal to the digital self-interfering component to produce a cancellation output; and
- removal circuitry coincident with the second wireless interface, the removal circuitry configured to destructively combine the cancellation output and digital self-interfering component.

17. The device of claim 16, further comprising control circuitry configured to determine a parameter of the cancellation filter based on a training routine.

18. The device of claim 17, where the training routine is configured to minimize an output of the removal circuitry during a training period.

19. The device of claim 18, where the second wireless interface is configure to transmit a message configured to pause transmission from the network controller circuitry.

20. The device of claim 16, where the first protocol comprises a cellular protocol and the second protocol comprises a WLAN protocol; and
where a spectral power density of the first signal is greater than a spectral power density of the second signal.

* * * * *